United States Patent [19]

Bell

[11] Patent Number: 4,993,536
[45] Date of Patent: Feb. 19, 1991

[54] CASE TURNING ASSIST ATTACHMENT FOR A PALLETIZING MACHINE

[76] Inventor: Michael J. Bell, 5028 Royalton Center Rd., Gasport, N.Y. 14067

[21] Appl. No.: 448,975

[22] Filed: Dec. 12, 1989

[51] Int. Cl.⁵ .............................................. B65G 47/24
[52] U.S. Cl. ................................. 198/374; 198/401; 198/411
[58] Field of Search ............... 198/401, 411, 412, 413, 198/374; 414/792.1

[56] References Cited

U.S. PATENT DOCUMENTS

| | | | |
|---|---|---|---|
| 2,761,542 | 9/1956 | Pagdin | 198/374 X |
| 2,963,143 | 12/1960 | Field | 198/374 |
| 2,997,187 | 8/1961 | Burt | 198/374 X |
| 3,874,740 | 1/1975 | Hurd . | |
| 3,945,682 | 3/1976 | Hoagland et al. . | |
| 4,026,422 | 5/1977 | Leenaards | 198/374 X |
| 4,042,099 | 8/1977 | Sterling . | |
| 4,302,134 | 11/1981 | Johnson, Jr. et al. . | |
| 4,489,736 | 12/1984 | Bolt . | |

FOREIGN PATENT DOCUMENTS

| | | | |
|---|---|---|---|
| 3524339 | 1/1987 | Fed. Rep. of Germany | 198/411 |
| 0023115 | 3/1981 | Japan | 198/411 |

Primary Examiner—D. Glenn Dayoan
Attorney, Agent, or Firm—Jerry T. Kearns

[57] ABSTRACT

A case turning assist attachment for a palletizing machine of the type including a linear live roller conveyor for conveying cases to a pallet loading rake, includes a push member operably connected to a double acting air cylinder controlled by an air switch. The air switch includes an abutment member for activating an air valve upon contact with a forward end of a case. The case turning attachment allows a faster and more efficient operation of a conventional type of palletizing machine by more rapidly orienting cases to be palletized in a correct position.

1 Claim, 5 Drawing Sheets

CASE TURNING ASSIST ATTACHMENT FOR A PALLETIZING MACHINE

BACKGROUND OF THE INVENTION

1. Field of the Invention

The present invention relates to palletizing machines, and more particularly pertains to a case turning assist attachment for a conventional type of palletizing machine known in the industry as the VON GAL PALLETIZER. This type of palletizing machine includes a linear live roller assembly for conveying cases to a pallet loading rake. A double acting air cylinder case turner is conventionally disposed upstream from the palletizing rake for turning cases to a correct transverse orientation prior to reaching the palletizing rake. The present invention is directed to an attachment for improving the efficiency of this type of palletizing machine by speeding up the time it takes for a case of packaged goods to be turned. By speeding up the case turning time, the delay time for the palletizing rake will be decreased, thereby resulting in more cases per minute being raked onto a pallet. This results in higher efficiencies and also provides better case handling capabilities. On the original equipment VON GAL PALLETIZER, the cases are fed onto the machine by use of a metering belt driven conveyor. The cases are then placed on a section of the machine which is driven by live rollers. As the cases proceed down the live rollers, they are counted and when the count reaches a specific number, which is predetermined by whatever layer configuration the manufacturer needs for his materials to be placed upon to the pallet, an air cylinder is activated which extends a piece of flat metal either up between the live rollers, or on some models it may be extended from the side of the live roller section. The bottom left corner of the case then hits this piece of metal and as the rollers are rotated in a forward direction, this forces the case to gradually turn sideways on the live rollers and proceed to the rake. One of the problems with this original equipment is that the live rollers become slippery and the cases are a lot slower in turning to a lateral orientation. This results in the palletizing rake starting to move before the case is in correct position, which results in damaged materials. In order to overcome this problem, the present invention provides an economical attachment including a mechanically operated air solenoid switch and an air cylinder pusher. These components are easily connected to the air supply of the original case turner. Through the present invention, the efficiency of this conventional form of palletizing machine is greatly improved for a nominal investment.

2. Description of the Prior Art

Various types of packaging machines are known in the prior art. A typical example of such a device is to be found in U.S. Pat. No. 3,874,740, which issued to S. Hurd on Apr. 1, 1975. This patent discloses an orienting apparatus for cap-shaped members. An air jet is utilized to orient the members on a conveyor belt. U.S. Pat. No. 3,945,682, which issued to J. Hoagland et al on Mar. 23, 1976, discloses an article transferring machine in which articles are fed at regular intervals into rotating pockets and advance along an arcuate path to a discharge area. U.S. Pat. No. 4,042,099, which issued to W. Sterling on Aug. 16, 1977, discloses an air controlled switch utilized in conjunction with a rotatable sorting table for orienting items and delivering the properly oriented items to a discharge passage. U.S. Pat. No. 4,302,134, which issued to A. Johnson Jr. et al on Nov. 24, 1981, discloses a mechanism for capturing ejected articles from a carrier and for re-oriented articles along an assembly line. U.S. Pat. No. 4,489,736, which issued to R. Bolt on Dec. 25, 1984, discloses a cigarette packaging machine including an air jet mechanism for laterally ejecting cigarettes from a conveyor.

While the above mentioned devices are directed to various conveying and packaging machines, none of these devices disclose an auxiliary case turning attachment for turning a case to a transverse orientation on a live roller conveyor section of a palletizing machine. Inasmuch as the art is relatively crowded with respect to these various types of attachments, it can be appreciated that there is a continuing need for and interest in improvements to such attachments, and in this respect, the present invention addresses this need and interest.

SUMMARY OF THE INVENTION

In view of the foregoing disadvantages inherent in the known types of attachments now present in the prior art, the present invention provides an improved case turning assist attachment for a palletizing machine. As such, the general purpose of the present invention, which will be described subsequently in greater detail, is to provide a new and improved case turning assist attachment for a palletizing machine which has all the advantages of the prior art attachments and none of the disadvantages.

To attain this, a representative embodiment of the concepts of the present invention is illustrated in the drawings and makes use of a case turning assist attachment for a palletizing machine of the type including a linear live roller conveyor for conveying cases to a pallet loading rake, which includes a push member operably connected to a double acting air cylinder controlled by an air switch. The air switch includes an abutment member for activating an air valve upon contact with a forward end of a case. The case turning attachment allows a faster and more efficient operation of a conventional type of palletizing machine by more rapidly orienting cases to be palletized in a correct position.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially those who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is another object of the present invention to provide a new and improved case turning assist attachment for a palletizing machine which may be easily and efficiently manufactured and marketed.

It is a further object of the present invention to provide a new and improved case turning assist attachment for a palletizing machine which is of a durable and reliable construction.

An even further object of the present invention is to provide a new and improved case turning assist attachment for a palletizing machine which is susceptible of a low cost of manufacture with regard to both materials and labor, and which accordingly is then susceptible of low prices of sale to the consuming public, thereby making such attachments economically available to the buying public.

Still yet another object of the present invention is to provide a new and improved case turning assist attachment for a palletizing machine which provides in the apparatuses and methods of the prior art some of the advantages thereof, while simultaneously overcoming some of the disadvantages normally associated therewith.

Still another object of the present invention is to provide a new and improved case turning assist attachment for a palletizing machine for increasing the speed of operation of a palletizing rake assembly.

Yet another object of the present invention is to provide a new and improved case turning assist attachment for a palletizing machine which is easily installed to an existing air supply.

Even still another object of the present invention is to provide a new and improved case turning assist attachment for a palletizing machine to provide an increase in palletizing efficiency with a nominal investment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
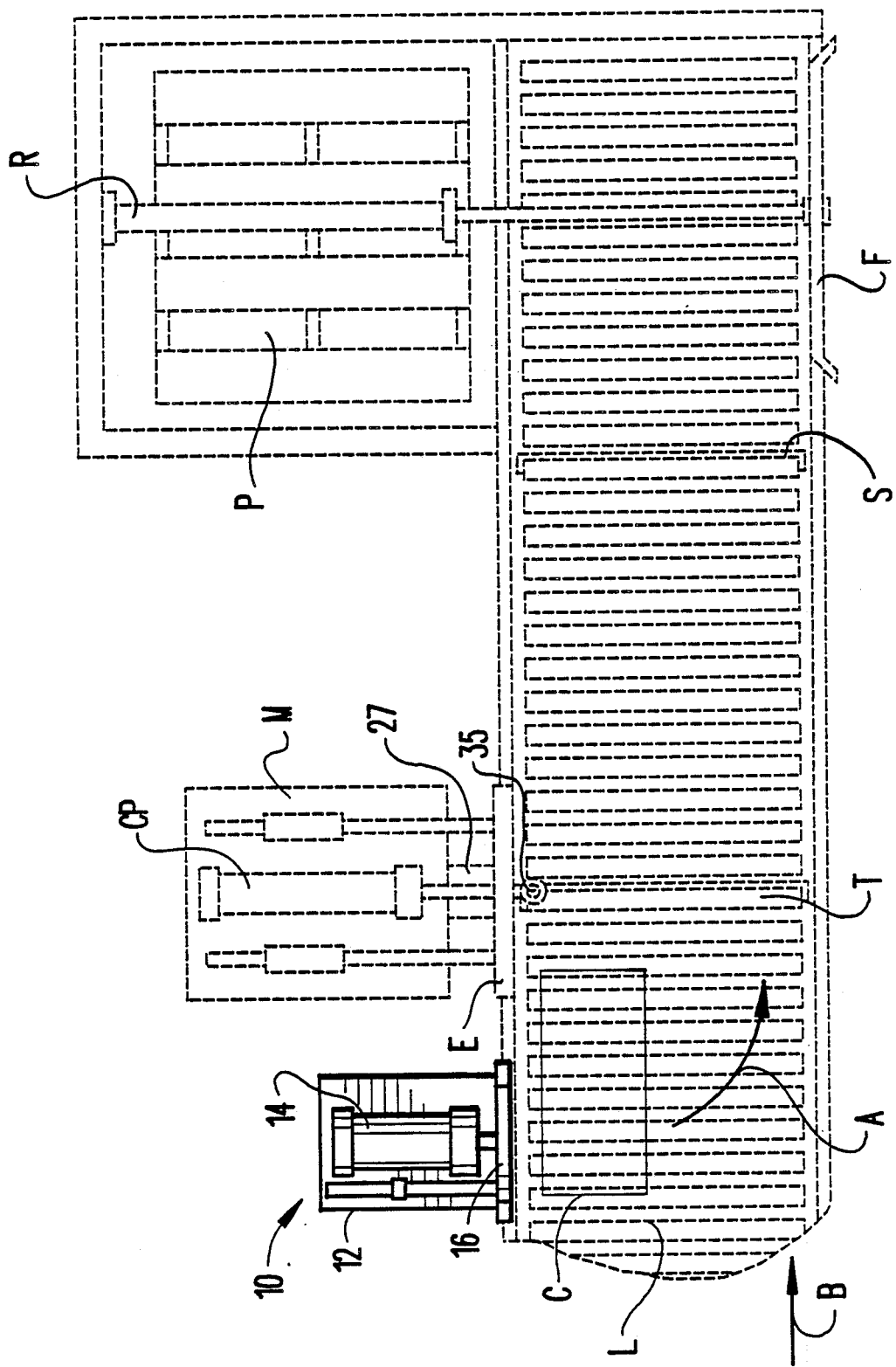
FIG. 1 is a top plan view illustrating the case turning assist attachment of the present invention installed on a conventional palletizing machine.

With reference now to the drawings, and in particular to FIG. 1 thereof, a new and improved case turning assist attachment for a palletizing machine embodying the principles and concepts of the present invention and generally designated by the reference numeral 10 will be described.

More specifically, it will be noted that the first embodiment 10 of the invention includes a base plate 12 on which a double acting pneumatic cylinder 14 is secured. A push member 16 is operably connected to the piston rod of the piston cylinder assembly 14. An air solenoid switch 27 includes an abutment member 35 for activating the valve upon contact with a forward corner of a case C of packaged goods to be palletized. The conventional VON GAL type of palletizing machine includes a live roller conveyor section L formed by a plurality of driven rollers. The direction of travel of the case C along the live roller conveyor L is indicated by arrow B. The conventional palletizing machine includes a mounting base M which supports a double acting piston-cylinder assembly CP of a case pusher rake E. The case turner section T of the palletizing machine causes the case C to be rotated to a transverse orientation, through an angle of 90 degrees, in the direction indicated by the arrow A. Conventionally, the case turner is operative to move a small metal abutment plate upwardly, between the rollers, into engagement with a front corner portion of the case C. As the live rollers L continue to rotate, this causes the case C to slowly turn to a transverse orientation. The problem arises when the live rollers L become slippery as the result of prolonged operation of the machine. The rollers L then do not provide an adequate frictional engagement with the case C to cause an expedient turning to the correct transverse orientation. In the conventional operation of the machine, the case C, after being turned to a transverse orientation, continues along the conveyor L to a case stop S. The case is then allowed to advance where it is raked onto a pallet P by a pneumatic rake F actuated by a piston-cylinder assembly R. The case turning assist attachment 10 of the present invention is operative to extend the case pusher 16 to contact the rear corner portion of the case C upon contact of the forward corner of the case C with the switch abutment member 35. This increases the speed at which the case C is rotated in the direction of the arrow A. This allows an increase in the operating speed of the machine, and results in greater efficiency and case handling capabilities.

Figure 2:
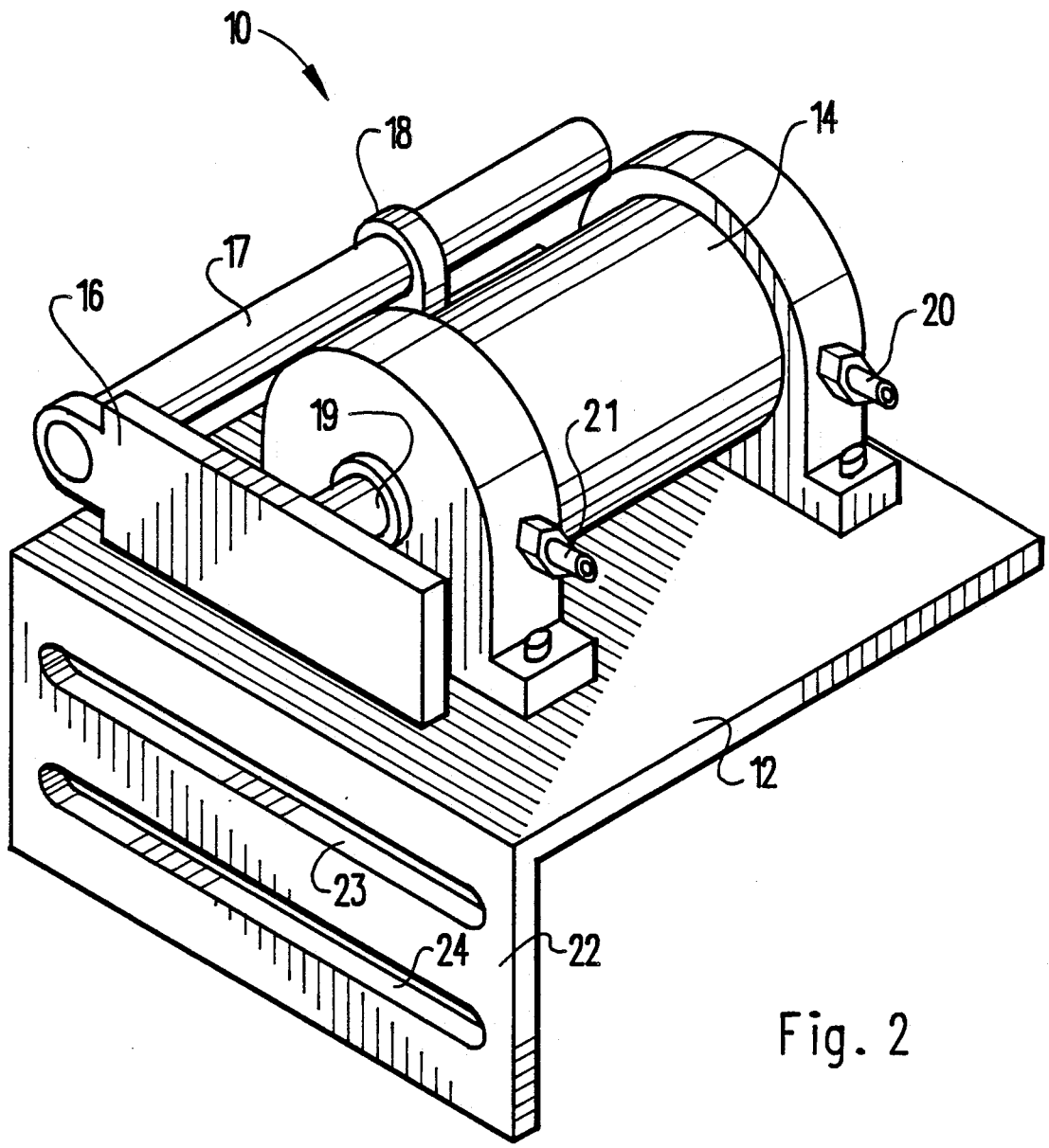
FIG. 2 is a perspective view of the pneumatic case turning pusher portion of the attachment of the present invention.

As shown in FIG. 2, the assist attachment 10 includes a base or mounting plate 12 having a vertical right angle flange portion 22 provided with elongated slots 23 and 24 for securing the mounting plate 12 to a side rail portion of the conveyor assembly of the palletizing machine. A double acting type air cylinder 14 includes connections 20 and 21 for connection to an air supply. The piston rod 19 is connected to a transverse plate 16, which is adapted to engage the rear corner portion of a case. A guide rod 17 is slidably received in a bearing 18 to stabilize the reciprocal linear movement of the push member 16.

Figure 3:
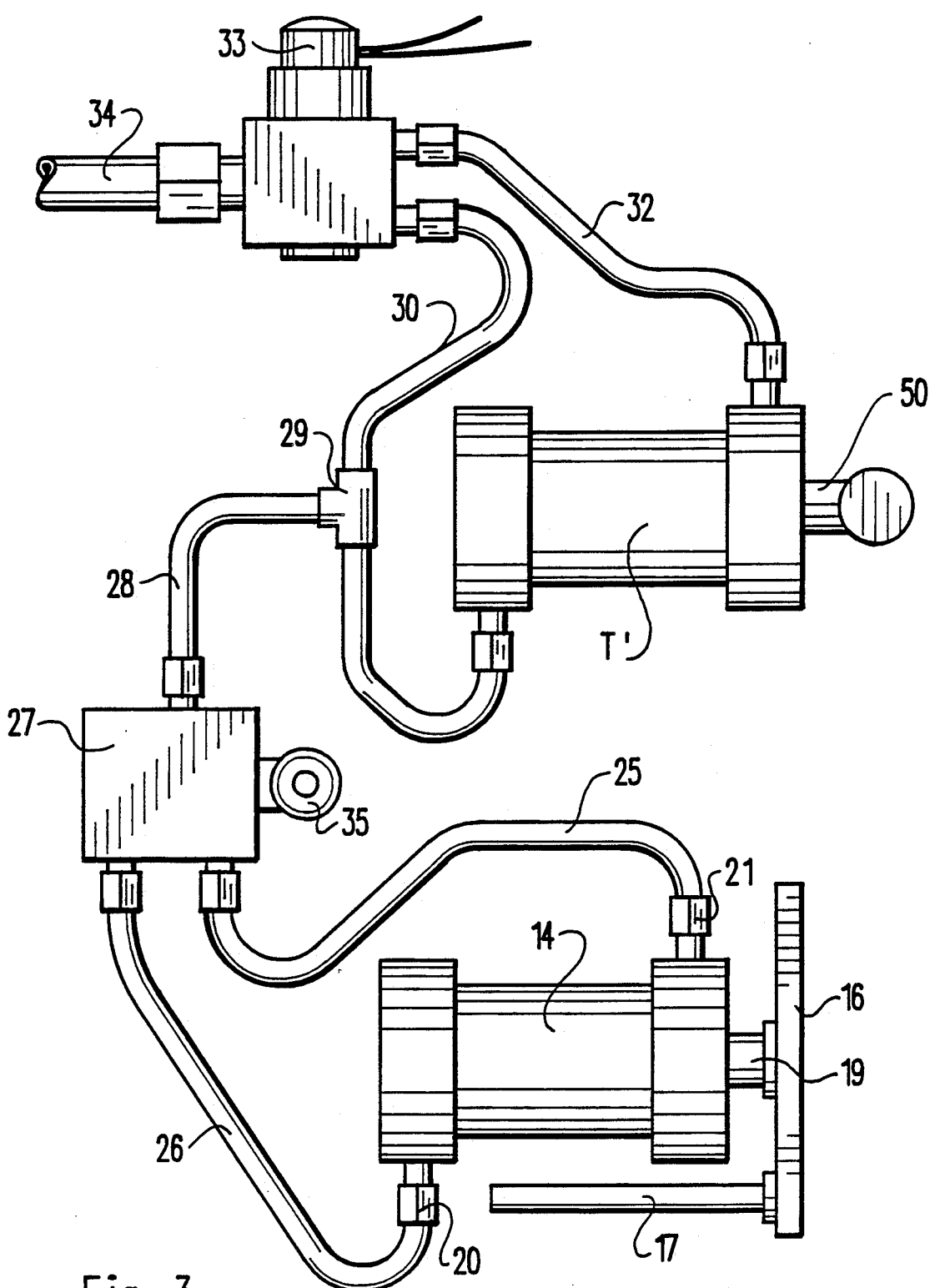
FIG. 3 illustrates the air circuit of the components of the present invention, as connected to the air supply of a conventional palletizing machine.

FIG. 3 illustrates the connection of the components of the present invention in the air system of the conventional palletizing machine. The conventional palletizing machine includes a main air supply line 34 which is connected to an electrical air solenoid valve 33. The solenoid valve 33 is connected to conduits 30 and 32 which extend to opposite ends of the piston-cylinder assembly of the original equipment case turner section T, which is located under the live rollers L. Thus, the solenoid valve 33 selectively allows air to flow through one of the lines 30 or 32 to extend and retract the case abutment member secured to the piston rod 50 of the piston-cylinder assembly T'. In the connection of the attachment of the present invention, a T-fitting 29 is installed in the conduit 30. A conduit 28 is connected to the T-fitting 29 and extends as a supply line to the solenoid air switch 27. The switch 27 is connected to conduits 25 and 26, and includes an internal valve mechanism for selectively directing the air supply from the line 28 to one of the conduits 25 or 26. The switch 27 additionally includes an abutment member 35 which activates the switch 27 upon contact with the forward end of a case on the live roller conveyor. Considering the illustrated connection, it is apparent that air is only supplied through the line 30 to the T-fitting 29 and switch supply 28 when the solenoid valve 33 is operative to connect the air supply 34 to actuate the original equipment case turner assembly T. Thus, when a case initializes the operation of the original equipment case turner and just subsequently comes into contact with the abutment member 35 of the switch 27, air will be supplied through the line 26 to extend the piston rod 19 and urge the push member 16 into contact with the rearward corner portion of the case. When the case has reached the correct transverse orientation, the original equipment controls cause the solenoid valve 33 to connect the air supply line 34 to the line 32, thus deactuating the original equipment case turner T. Prior to this event, the forward corner portion of the case has moved out of contact with the abutment portion 35 of the switch 27, causing the internal valve to redirect the air from the line 28 through the line 25, thus retracting the piston rod 19 and attached push member 16.

Figure 4:
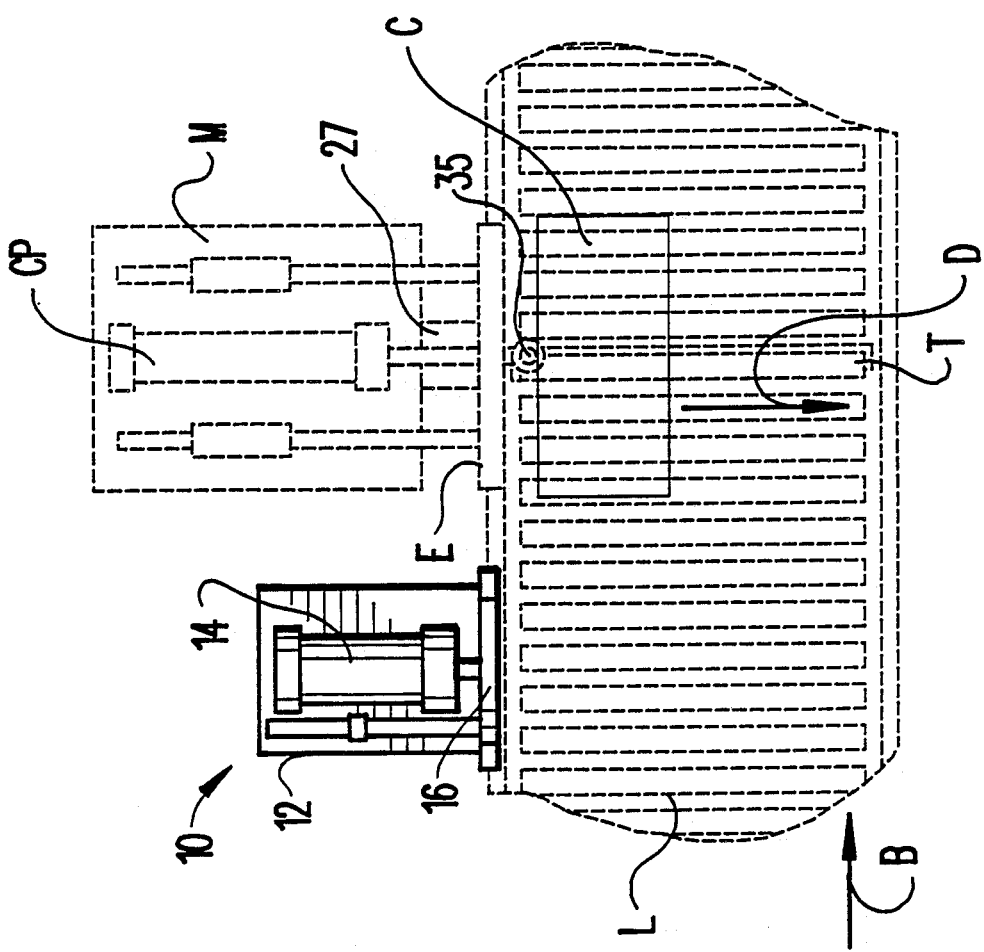
FIG. 4 is a partial top plan view, further illustrating the manner of operation of the palletizing machine of FIG. 1.

FIG. 4 is a partial plan view of the palletizing machine, which illustrates the function of the conventional case pusher rake E, actuated by the piston-cylinder assembly CP. The pusher E is operative to move the case C laterally across the rollers L, as indicated by arrow D. This allows cases to be oriented in side by side relation adjacent the pallet rake F, in a conventional fashion. It should be noted that the case pusher CP and case turner T are never operated simultaneously, but may be alternately actuated to control the layer configuration of the case load on the pallet.

Figure 5:
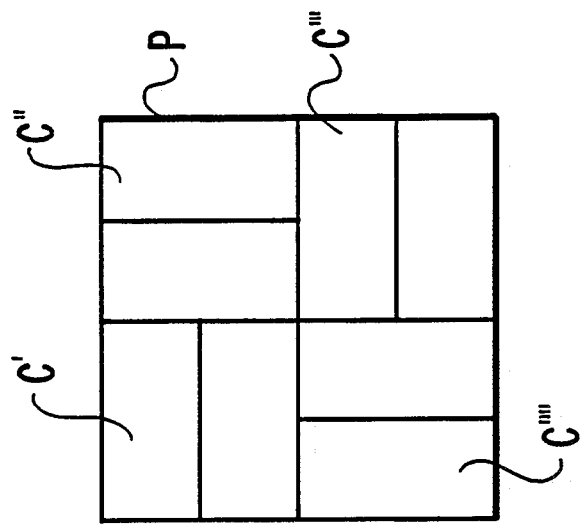
FIG. 5 is a diagrammatic view illustrating a typical pallet load case arrangement.

FIG. 5 illustrates an example layer configuration of cases on the pallet P. The variously oriented cases C', C'', C''', and C'''' are positioned by suitable actuation of the case turner T or case pusher CP.

Figure 6:
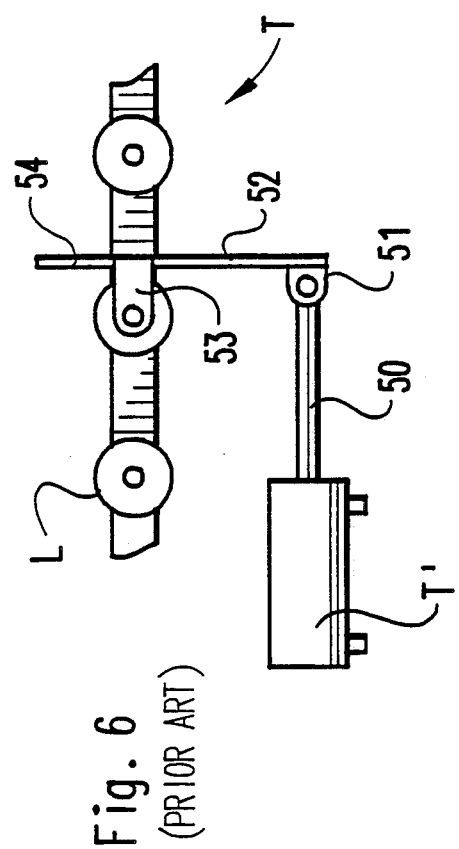
FIG. 6 is a side detail view, illustrating the conventional case turning attachment in an operative raised position.

FIG. 6 illustrates the conventional case turner T. The double acting cylinder T' is mounted beneath the live rollers L, and includes a piston rod 50 pivotally connected to a bracket 51 on a vertical leg 52. Another bracket 53 on an opposite upper end of the vertical leg 52 is pivotally connected to one of the roller axles. A transverse arm includes an upwardly stepped case abutment portion 54 which is movable upwardly, between the rollers L, upon extension of the rod 50.

Figure 7:
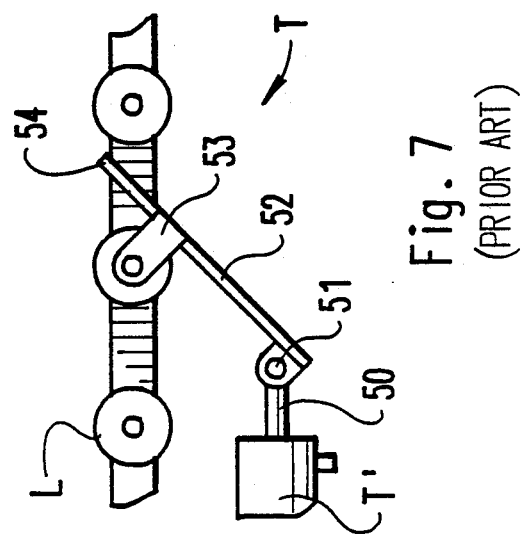
FIG. 7 is a side detail view, illustrating the conventional case turning attachment in an inoperative lowered position.

As shown in FIG. 7, the stepped case abutment portion 54 is movable to a retracted position upon retraction of the rod 50.

Figure 8:
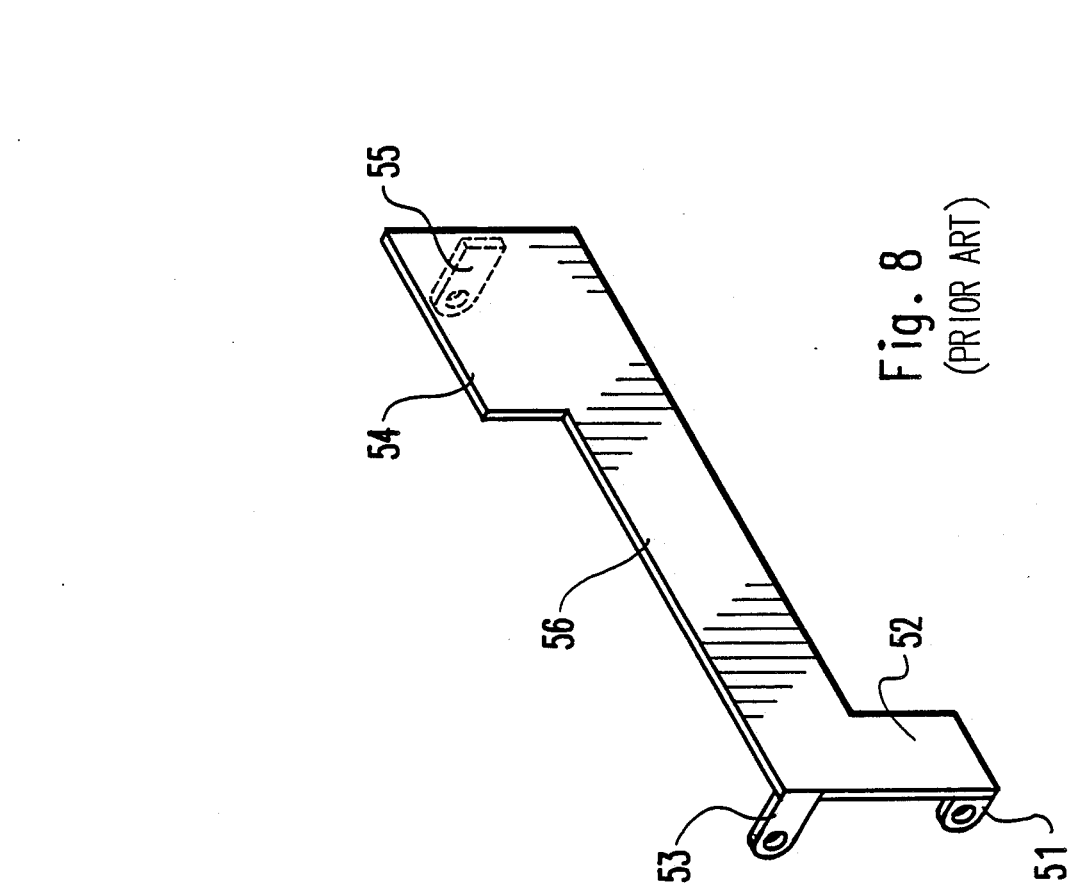
FIG. 8 is a perspective view, illustrating an abutment arm portion of the conventional case turning attachment.

FIG. 8 illustrates a perspective view which further illustrates the case abutment portion 54 of the conventional case turner. An additional bracket 55 is pivotally secured to an opposite end of the roller axle upon which the bracket 53 is mounted. The abutment portion 54 is connected to the vertical leg 52 by a transverse arm 56.

As may now be understood, the present invention provides an easily installed and economical attachment which requires no modifications to the control system of the original palletizing machine.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. In a palletizing machine having a linear live roller conveyor for conveying cases, a case turner including a double acting air piston cylinder assembly, an air supply including a first and second conduits connected to opposite ends of said double acting air piston cylinder assembly, an electrical valve for alternatively connecting said air supply to said first conduit to actuate said case turner and to said second conduit to deactuate said case turner, the improvement comprising:

a case turning assist attachment disposed upstream said live roller conveyer from said case turner, said case turning assist attachment including a push member operably connected to an actuating piston cylinder assembly and an actuating switch for activating said actuating piston cylinder assembly, said push member and actuating switch disposed at spaced locations along said live roller conveyer whereby contact of a forward end of a case with said actuating switch causes said push member to engage a rearward end of the case;

said actuating switch including an air valve and an abutment member for actuating said air valve upon contact with a case; and said air valve connected in said first conduit to said air supply between said electrical valve and said double acting air piston cylinder assembly, such that air is only supplied to said air valve when said case turner is actuated.

* * * * *